Sept. 7, 1965  W. F. RUSH  3,204,425
GAS—LIQUID CONTACT APPARATUS
Filed April 17, 1964
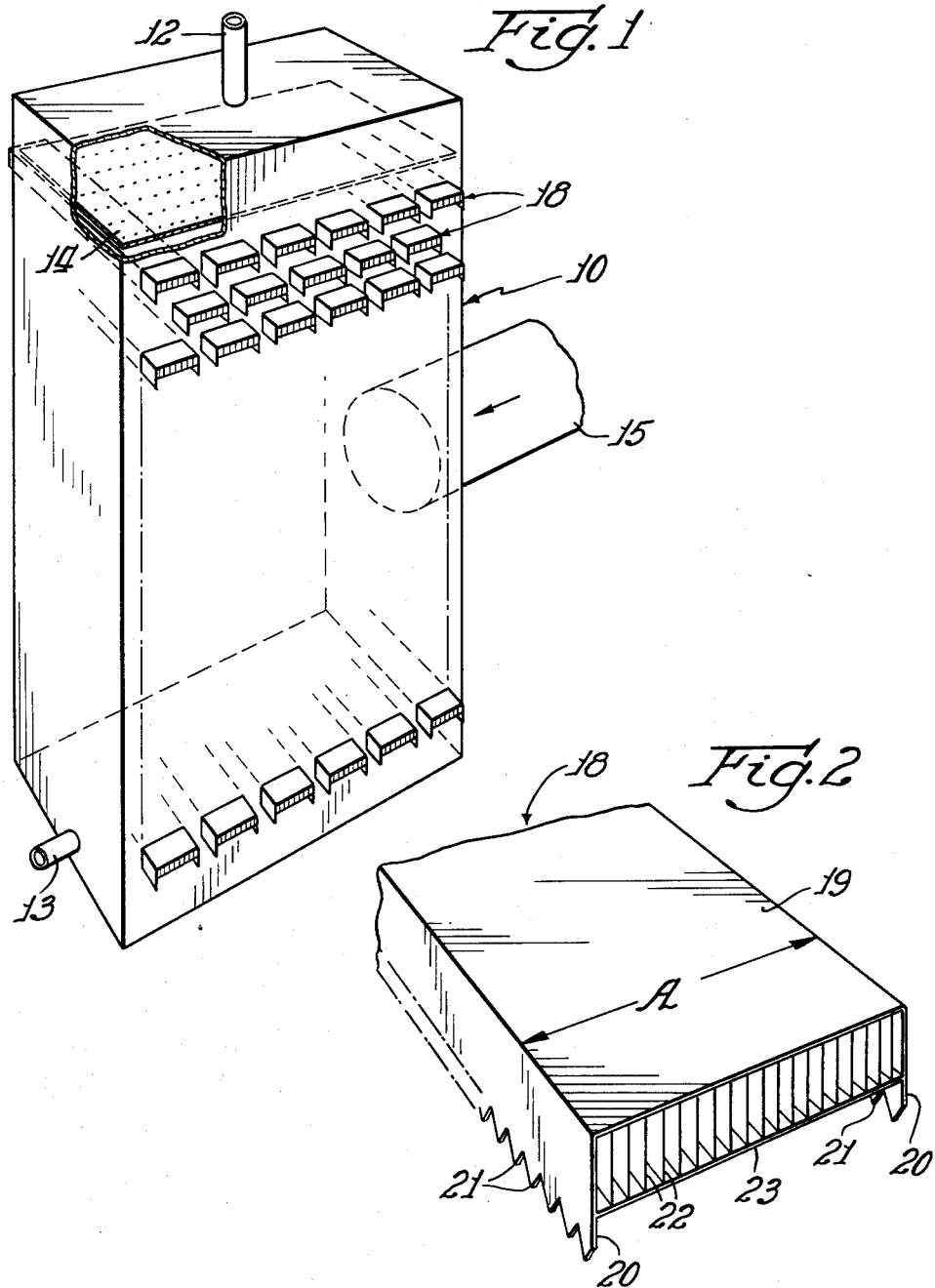
Inventor:
William F. Rush
By: Thomas B. Hunter Atty.

United States Patent Office 3,204,425
Patented Sept. 7, 1965

1

3,204,425
GAS-LIQUID CONTACT APPARATUS
William F. Rush, Arlington Heights, Ill., assignor to Borg-Warner Corporation, Chicago, Ill., a corporation of Illinois
Filed Apr. 17, 1964, Ser. No. 360,569
7 Claims. (Cl. 62—485)

This invention relates to gas-liquid contact apparatus and more particularly to improvements in absorbers used in absorption refrigeration systems.

In conventional absorption refrigeration systems, a gas-liquid contact unit is provided for absorbing the refrigerant vapor from the evaporator section. This is the vapor which is formed when the liquid refrigerant passes in heat exchange relation with the medium to be cooled. For example, if the system uses water as the refrigerant and a hygroscopic brine such as LiBr as the absorbent, the water vapor formed in the evaporator is absorbed in the "thirsty" concentrated LiBr solution. As more and more water vapor is absorbed, the solution becomes diluted and the resulting dilute solution is circulated to a generator where the water is boiled out of the solution by means of the external heat supplied to said generator. The vaporized refrigerant from the generator is condensed in a condenser unit and then circulated to the evaporator section where it is brought in contact with the chiller coil. The absorber solution which is concentrated in the generator, is circulated back to the absorber to complete the refrigeration cycle.

There are a number of combinations of refrigerant and absorbent which may be used in systems of the type described above. Heretofore, most of the commercially available systems have used LiBr or LiCl and water or an aqua-ammonia combination. On a theoretical basis, however, there are many other combinations of refrigerant and absorbent which would be more efficient. Generally speaking, the properties required for an ideal combination would include (a) high solubility of the refrigerant in the absorbent, (b) large negative deviations from Raoult's law, (c) an absorbent and refrigerant which exhibits minimum corrosion effects, and (d) an absorbent having a relatively low specific heat.

Recent research into new types of absorbent and refrigerant combinations have indicated that a number of such combinations show considerable promise. It has been found, however, that many of these solutions have a relatively high viscosity which results in serious problems. For example, in the absorber, where the heat of solution must be removed (resulting from water vapor being absorbed into the hygroscopic brine), the more viscous solutions do not wet the heat transfer surfaces sufficiently in the conventional tube and shell or wetted-wall column type absorbers. The absorber solution tends to channel itself over limited surface areas of the heat exchange elements and consequently cannot operate without a considerable loss of heat exchange efficiency. This problem is particularly important where air is used as the coolant to remove the heat of solution. Merely increasing the area of the heat transfer surface does not provide a satisfactory solution because of the expense involved and the additional size required. Moreover, there are additional problems in connection with the pressure drop across the coolant side of the heat exchanger. For example, if the tubes are provided with internal fins to get maximum heat transfer from the coolant, the resistance to flow offered by these fins increases the pressure drop and limits optimum efficiency.

Briefly described, the present invention embraces the concept of using a unique geometry of heat exchange surfaces which present a relatively flat area to liquid absorber solution in contact therewith. This has a dual effect in that it promotes the spreading out of a thin film of solution over the heat transfer surface and also tends to maintain the solution in contact with the surface over a longer period of time. Means are also provided for increasing the uniformity of flow through the absorber.

It is therefore a principal object of the invention to provide an improved gas-liquid contact apparatus which maximizes heat exchange efficiency.

Another object of the invention is to provide an improved absorber which is simple in construction, small in size, and yet affords a large heat transfer and contact surface for solution to mix with refrigerant vapor.

Another object of the invention is to provide apparatus which is especially adapted for use with relatively viscous absorber solutions which do not flow uniformly in the conventional absorber.

Another object of the invention is to provide apparatus of the character described which is especially adapted for use in systems employing air as the absorber coolant.

Other objects and advantages will be apparent from a reading of the following detailed description taken in conjunction with the drawings wherein:

FIGURE 1 is an isometric view of an absorber constructed in accordance with the principles of the present invention; and FIGURE 2 is a detailed isometric view of one of the heat exchange elements.

Referring now to the drawings and particularly to FIGURE 1, the absorber constructed in accordance with the principles of the present invention includes an enclosure or casing 10 defining a gas-liquid contact zone, said enclosure having an upper portion provided with inlet means 12 for absorber solution from the generator (not shown), and a lower portion provided with an outlet 13 for conducting the absorber solution, after having been diluted by the absorption of water vapor during its pass through the gas-liquid contact zone, back to the generator. The concentrated absorber solution flows from inlet 12 to a distributor plate 14 of any suitable type which is provided with means for uniformly distributing the flow of absorber solution in a rain-like pattern over the entire cross-sectional area of the absorber. The particular construction of the distributor is not essential to the operation of the absorber so long as it does not tend to channel the solution into localized flow through the zone. There are many known forms of construction and the details need not be of concern.

Means for introducing the refrigerant vapor to be absorbed (from the evaporator) is provided in the form of a conduit 15 opening into the side of the enclosure, it being understood that the absorber and the evaporator can be mounted within the same enclosure since they are both maintained at the same pressure. The hygroscopic action of the concentrated solution prevents the pressure from rising within the evaporator and absorber by absorbing the refrigerant vapor almost as fast as it is released.

A plurality of heat exchange elements 18 are supported by the walls of the enclosure and extend transversely through the contact zone. Each of these elements comprises a hollow tube having terminal portions which are open to the ambient air surrounding the enclosure. Air may be circulated through the tubes either by natural flow or by some positive means such as a fan or other air moving device. It will be noted especially from FIGURE 2, that each of the heat exchange tubes has a generally rectangular cross-sectional area that presents a relatively broad, laterally extending upper surface 19 to promote spreading out of a thin film of solution and increasing the time that the solution remains in contact with the heat transfer surfaces. The term "laterally extending," as used herein, means the width dimension designated at A in FIGURE 2. Each of the heat exchange tubes further includes a skirt portion 20 which extends downwardly from each side of the tubes. The skirt portion 20 is preferably provided with a serrated edge 21 to induce formation of droplets thus providing a more uniform flow of the solution through the gas-liquid contact zone. The tooth geometry which has been found to be most satisfactory has 2–3 teeth per inch with a vertex angle of 45°. The tubes may also be provided with a plurality of heat conductive fins 22 which extend in contact with the primary heat exchange area 19 to maximize heat transfer from the coolant flowing through the tubes. While the fins are shown as extending from the primary heat exchange surface 19 to the bottom side 23, it is obvious that various other arrangements of this fin structure may be provided.

The tubes, in a preferred embodiment, are arranged in a plurality of vertically spaced rows in staggered relation so that the solution flowing downwardly through the contact zone drips off the serrated skirt portions onto the laterally intermediate portion of the upper surface of each tube along substantially the entire length thereof.

While this invention has been described in connection with a certain specific embodiment thereof, it is to be understood that this is by way of illustration and not by way of limitation; and the scope of this invention is defined solely by the appended claims which should be construed as broadly as the prior art will permit.

I claim:

1. An absorber adapted for use in an absorption refrigeration system which includes an evaporator operatively associated therewith comprising an enclosure defining a gas-liquid contact zone; means for supplying absorber solution to said contact zone so that it is distributed in a rain-like pattern over the entire cross-sectional area of said contact zone; a plurality of hollow tubes extending through said enclosure and across said contact zone, said tubes having open ends through which ambient air flows, said tubes having a generally rectangular cross-section and having a flat upper surface of substantial width on which the absorber solution impinges; heat conducting fins disposed within said tubes; means defining a skirt portion extending downwardly from each side of said tubes; said skirt portion having means for inducing droplet formation from the sides of said tubes; and means for introducing water vapor from said evaporator into said gas liquid contact zone.

2. Apparatus as defined in claim 1 wherein said tubes are arranged in staggered relation so that the liquid absorber solution flowing downwardly from a superjacent tube falls approximately on the laterally intermediate portion of the upper surface of each tube along substantially the entire length thereof.

3. An absorber adapted for use in an absorption refrigeration system, said system including an evaporator operatively associated with said absorber, comprising an enclosure defining a contact zone in which refrigerant vapor from the evaporator is brought into contact with a hygroscopic absorber solution; means for distributing said absorber solution so that it flows uniformly in a rain-like pattern through said zone; a plurality of heat exchange elements extending transversely through said zone below said solution distributing means, said heat exchange elements each comprising a hollow tube having a generally rectangular cross-section and including a generally flat upper surface to promote spreading of a thin film of absorber solution over said surface and to increase the retention time that the absorber solution is held on an individual heat exchange element, said tubes further including open terminal portions extending outside of said enclosure to permit the flow of ambient air therethrough; and means for introducing refrigerant vapor from said evaporator into said contact zone.

4. Apparatus as defined in claim 3 wherein said hollow tubes are arranged in a staggered array so that the liquid flowing downwardly from a superjacent tube falls approximately on the laterally intermediate portion of the upper surface of each tube along substantially the entire length thereof.

5. Apparatus as defined in claim 4 wherein each said tube includes a downwardly extending skirt portion on each side thereof, said skirt portion having a serrated edge to induce droplet formation.

6. Apparatus as defined in claim 5 including a plurality of heat conducting fins extending internally of each of said hollow tubes.

7. Apparatus as defined in claim 5 wherein said serrated edge comprises a plurality of tooth-like projections, the vertices of which have an angle of approximately 45°.

References Cited by the Examiner

UNITED STATES PATENTS

| Re. 18,494 | 6/32 | Knight | 62—492 |
|---|---|---|---|
| 1,138,081 | 5/15 | Carrier | 261—108 |
| 2,318,621 | 5/43 | O'Brien | 62—494 |

ROBERT A. O'LEARY, *Primary Examiner.*